United States Patent
Hazan et al.

(10) Patent No.: US 10,575,068 B2
(45) Date of Patent: *Feb. 25, 2020

(54) STREAMING PIRACY DETECTION METHOD AND SYSTEM

(71) Applicant: Synamedia Limited, Middlesex (GB)

(72) Inventors: Avi Hazan, Elad (IL); Oriel Elkabatz, Tiberias (IL)

(73) Assignee: Synamedia Limited, Middlesex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,833

(22) Filed: Oct. 24, 2018

(65) Prior Publication Data
US 2019/0069044 A1  Feb. 28, 2019

Related U.S. Application Data

(63) Continuation of application No. 15/202,592, filed on Jul. 6, 2016, now Pat. No. 10,136,194.

(51) Int. Cl.
*G06F 21/00* (2013.01)
*H04N 21/8358* (2011.01)
(Continued)

(52) U.S. Cl.
CPC ......... *H04N 21/8358* (2013.01); *G06F 21/16* (2013.01); *G06T 1/0071* (2013.01);
(Continued)

(58) Field of Classification Search
CPC ......... H04N 21/8358; H04N 21/42684; H04N 21/4182; H04N 21/4181; H04N 21/26606;
(Continued)

(56) References Cited

U.S. PATENT DOCUMENTS 5,818,531 A * 10/1998 Yamaguchi ............... G06T 3/40
375/240.2
6,226,387 B1 * 5/2001 Tewfik ................. G06T 1/0028
375/E7.04
(Continued)

FOREIGN PATENT DOCUMENTS

GB      2505657 A  *  3/2014
JP      04042887     *  2/2014
(Continued)

OTHER PUBLICATIONS

"How to remove transparent watermark from a video", Forum VideoHelp, Thread# 372412, Jun. 16, 2015, available on the web at http://forum.videohelp.com/threads/372412-How-to-remove-transparent-watermark-from-a-video (Year: 2015).*
(Continued)

*Primary Examiner* — John B King
(74) *Attorney, Agent, or Firm* — Merchant & Gould P.C.

(57) ABSTRACT

In one embodiment, a command is received from a video provider at a media rendering device, the command being a command to embed a subscriber ID in at least one video frame in a video stream. A random key, k is also received from the video provider at the media rendering device. An injective transformation is invoked for k and the subscriber ID, the injective transformation generating a sequence of pairs of: near-transparent patterns and corresponding time periods. Logical blocks of the at least one video frame in the video stream are overlaid with one of the near-transparent patterns for its one of the corresponding time periods. Related apparatus, systems, and methods are also described.

20 Claims, 7 Drawing Sheets

(51) Int. Cl.
  *G06T 1/00* (2006.01)
  *H04N 21/2343* (2011.01)
  *H04N 21/8352* (2011.01)
  *H04N 19/46* (2014.01)
  *G06F 21/16* (2013.01)
  *H04N 5/913* (2006.01)
  *H04N 7/16* (2011.01)
  *H04N 7/167* (2011.01)
  *H04N 21/266* (2011.01)
  *H04N 21/418* (2011.01)
  *H04N 21/426* (2011.01)

(52) U.S. Cl.
  CPC .......... *G06T 1/0085* (2013.01); *H04N 5/913* (2013.01); *H04N 7/163* (2013.01); *H04N 7/1675* (2013.01); *H04N 19/46* (2014.11); *H04N 21/23439* (2013.01); *H04N 21/26606* (2013.01); *H04N 21/4181* (2013.01); *H04N 21/4182* (2013.01); *H04N 21/42684* (2013.01); *H04N 21/8352* (2013.01); *G06F 2221/0737* (2013.01); *H04N 2005/9135* (2013.01); *H04N 2005/91335* (2013.01)

(58) Field of Classification Search
  CPC ...... H04N 7/1675; H04N 7/163; H04N 5/913; H04N 19/46; H04N 21/8352; H04N 21/23439; H04N 2005/9135; H04N 2005/91335; G06T 1/0071; G06T 1/0085; G06T 1/0064; G06T 2201/0061; G06T 2201/0051; G06T 1/0021; G06F 21/16; G06F 2221/0737
  See application file for complete search history.

(56) References Cited

U.S. PATENT DOCUMENTS

| | | | | |
|---|---|---|---|---|
| 6,233,356 | B1 * | 5/2001 | Haskell | H04N 5/4401 348/408.1 |
| 6,411,725 | B1 * | 6/2002 | Rhoads | G06F 21/10 382/100 |
| 7,392,392 | B2 * | 6/2008 | Levy | G06T 1/0071 348/E7.06 |
| 7,609,762 | B2 * | 10/2009 | Crinon | H04N 21/23424 348/305 |
| 7,686,523 | B2 * | 3/2010 | Ando | G11B 27/034 385/95 |
| 7,813,822 | B1 * | 10/2010 | Hoffberg | G06K 9/00369 381/73.1 |
| 8,189,859 | B2 * | 5/2012 | Kim | H04N 5/913 382/100 |
| 8,316,237 | B1 * | 11/2012 | Felsher | H04L 9/0825 380/282 |
| 8,411,746 | B2 * | 4/2013 | Chen | H04N 21/234327 375/240.12 |
| 8,532,183 | B2 * | 9/2013 | Koo | H04N 19/597 375/240.12 |
| 8,532,332 | B2 * | 9/2013 | Kato | G06T 1/0071 382/100 |
| 8,780,999 | B2 * | 7/2014 | Chen | H04N 21/21805 375/240.25 |
| 9,131,264 | B2 * | 9/2015 | Oh | H04N 21/4355 |
| 2002/0162118 | A1 * | 10/2002 | Levy | H04N 7/088 725/110 |
| 2003/0142751 | A1 * | 7/2003 | Hannuksela | G11B 27/02 375/240.25 |
| 2004/0125125 | A1 * | 7/2004 | Levy | H04N 21/8352 715/716 |
| 2005/0177420 | A1 * | 8/2005 | Tanahashi | G06Q 30/0255 705/14.53 |
| 2005/0259729 | A1 * | 11/2005 | Sun | H04N 19/33 375/240.1 |
| 2006/0239501 | A1 * | 10/2006 | Petrovic | G06T 1/0028 382/100 |
| 2008/0101456 | A1 * | 5/2008 | Ridge | H04N 5/262 375/240.01 |
| 2008/0152146 | A1 * | 6/2008 | Conrado | G06F 21/10 380/278 |
| 2008/0301456 | A1 * | 12/2008 | Staring | G06F 21/16 713/176 |
| 2010/0215342 | A1 * | 8/2010 | Lee | H04N 5/913 386/241 |
| 2010/0316122 | A1 * | 12/2010 | Chen | H04N 21/234327 375/240.12 |
| 2010/0316134 | A1 * | 12/2010 | Chen | H04N 21/21805 375/240.25 |
| 2011/0243224 | A1 * | 10/2011 | Su | H04N 19/597 375/240.12 |
| 2012/0163653 | A1 * | 6/2012 | Anan | H04N 19/467 382/100 |
| 2015/0063626 | A1 * | 3/2015 | Martin | H04N 1/32325 382/100 |
| 2015/0278980 | A1 * | 10/2015 | Sinclair | G06T 1/0064 382/100 |
| 2017/0171615 | A1 * | 6/2017 | Xiang | H04N 21/44236 |

FOREIGN PATENT DOCUMENTS

| KR | 1193534 | * 10/2012 |
|---|---|---|
| WO | WO2010095321 | * 8/2010 |

OTHER PUBLICATIONS

"How to remove huge but transparent watermark", Forum VideoHelp, Thread# 337854, Jun. 16, 2015, available on the web at http://forum.videohelp.com/threads/337854-How-to-remove-huge-but-transparent-watermark (Year: 2015).*

"Toward Real-Time Detection of Forensic Watermarks to Combat Piracy by Live Streaming", Rudman et al., A Technical Paper presented at the SMPTE 2014 Annual Technical Conference & Exhibition, Oct. 21-23, 2014 (Year: 2014).*

* cited by examiner

STREAMING PIRACY DETECTION METHOD AND SYSTEM

CROSS-REFERENCE TO RELATED APPLICATION

This application is a continuation of U.S. patent application Ser. No. 15/202,592, filed Jul. 6, 2016, now U.S. Pat. No. 10,136,194, which is entirely incorporated herein by reference.

TECHNICAL FIELD

The present disclosure generally relates to forensic marking of video.

BACKGROUND

Video service providers contend with ongoing challenges posed by streaming piracy over the Internet. Streaming piracy has become one of the greatest threats to conditional access (CA) and digital rights management (DRM) systems at the present time. Pirates can use a simple frame grabber device in order to grab the video from a media rendering device, such as a set top box (STB), a tablet or hand-held device, or other appropriate media device, output (analog or HDMI), and then stream the output to their web site. Video service providers use human based-detection in order to detect pirated copies of the pirated video. The video service providers may send commands which cause fingerprints, comprising subscriber card IDs to be displayed on a viewing screen. The video service providers then manually search for such IDs in pirated copies of the content. Alternatives to this manual method include using optical character recognition (OCR) systems which parse on-screen IDs. However, OCR systems typically have about a 95% success rate, due to known OCR issues, such as "B-8" confusion etc.

Persons who attempt to gain unauthorized access to video, sometimes referred to as "Hackers" or "Pirates" may attempt to circumvent detection of such fingerprinted content by any of the following techniques:

Blocking of middleware or electronic program guide (EPG) processes by hardware modifications which cause IRQs (interrupt request lines) to overflow, thereby preventing proper communication between a set top box module which communicates with a security token, such as a smart card, and the EPG or middleware, thereby disabling fingerprinting;

Blocking of conditional access entitlement management messages (EMMs) which trigger fingerprinting;

Modification of the sections of EMMs and entitlement content messages (ECMs) directed to the media device module which communicates with the security token in order to remove fingerprint triggering;

Collaborative attacks, which use output of several media devices, where different areas between the output streams are blacked out; and Interlace attacks, which use outputs from several media devices, and interlacing one stream upon another one in order to blur the fingerprinted ID.

Such video, to which a hacker or pirate has gained unauthorized or illegal access may be referred to as hacked video, hacked content, rogue content, or other similar terms.

BRIEF DESCRIPTION OF THE DRAWINGS AND APPENDIX

The present disclosure will be understood and appreciated more fully from the following detailed description, taken in conjunction with the drawings in which.

The present invention will be understood and appreciated more fully from the following detailed description, taken in conjunction with the appendix in which:

Appendix A is a discussion of the computational difficulty of finding randomly positioned overlays by temporal analysis of video, especially if the hacker has access to both the encoded video (possibly content encrypted) and the rendered video frames.

DESCRIPTION OF EXAMPLE EMBODIMENTS

Overview

In one embodiment, a command is received from a video provider at a media rendering device, the command being a command to embed a subscriber ID in at least one video frame in a video stream. A random key, k is also received from the video provider at the media rendering device. An injective transformation is invoked for k and the subscriber ID, the injective transformation generating a sequence of pairs of: near-transparent patterns and corresponding time periods. Logical blocks of the at least one video frame in the video stream are overlaid with one of the near-transparent patterns for its one of the corresponding time periods. Related apparatus, systems, and methods are also described.

DESCRIPTIONS OF EXAMPLE EMBODIMENTS

Figure 1:
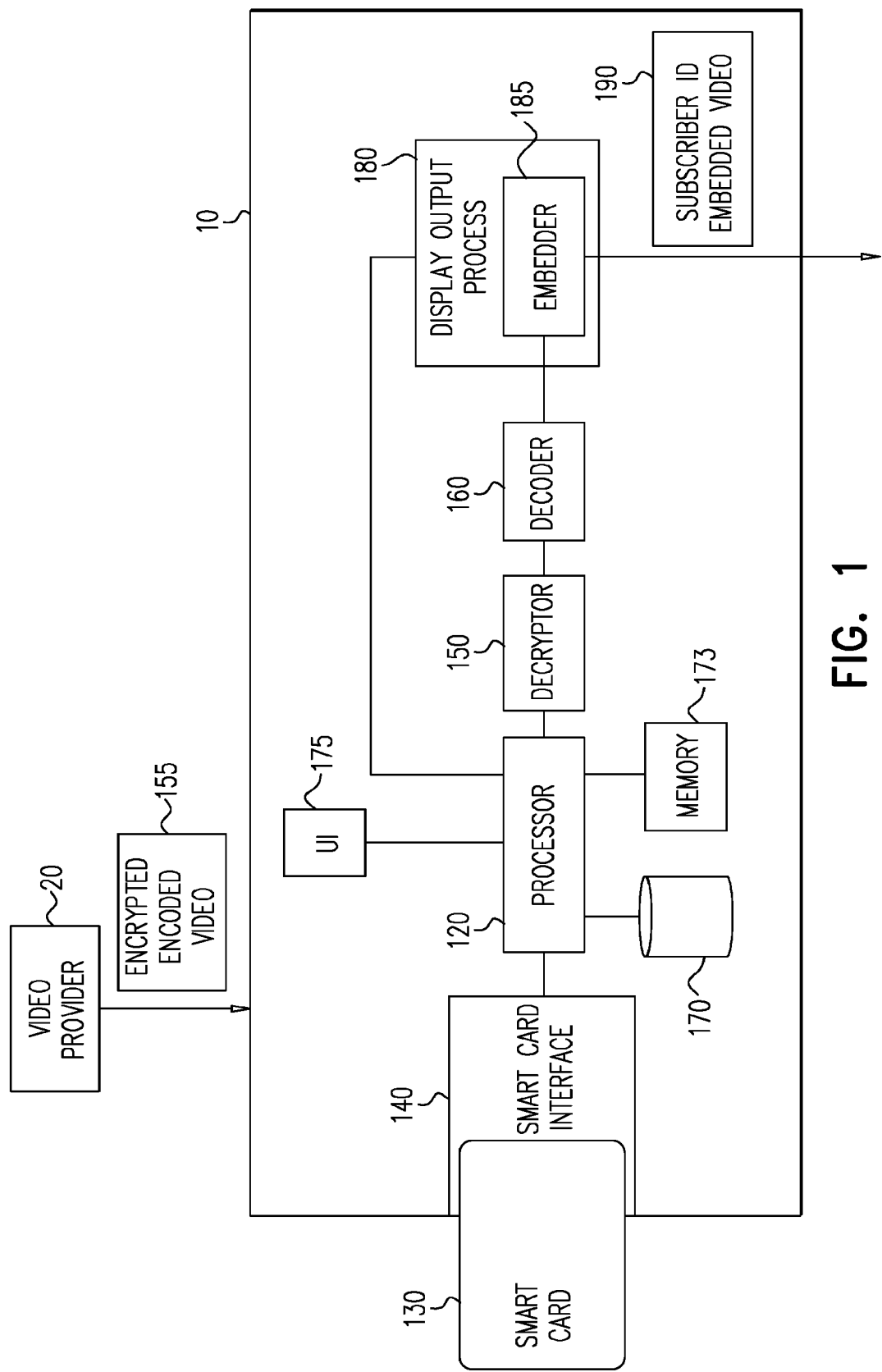
FIG. 1 is a simplified block diagram illustration of a set top box comprising an overlay embedding sub-system constructed and operative in accordance with an embodiment of the present invention.

Reference is now made to FIG. 1, which is a simplified block diagram illustration of an exemplary media device, i.e., a media rendering device 10, which could be, for example, a set top box (STB), a tablet or hand-held device, or other appropriate media device, comprising an overlay embedding sub-system constructed and operative in accordance with an embodiment. The media rendering device 10 of FIG. 1 is now described. It is appreciated that the various sub-systems of the media rendering device 10 mentioned below may comprise their own sub-systems, hardware, software, and so forth, as is known in the art. The media rendering device 10 receives video, typically in the form of encrypted encoded video 155 from a video provider 20. The video provider 20 may comprise at least one of a broadcast headend or a video server, such as an over the top (OTT) video server. FIG. 1 depicts logical relationships between processes and components, and not the physical relationship between those components. Additionally, components depicted in FIG. 1 may comprise physical hardware elements as well as logical or virtual components. As will be described below, the overlay embedding sub-system is comprised in a display output process, 180.

The media rendering device 10 typically comprises a processor 120, which may, be comprised of a single processor, several processors, including one or more specialized processor 120 for embedding a subscriber ID, which is typically a unique subscriber ID, as will be described below. The processor 120 is operationally connected to a security element, such as a smart card 130 via a smart card interface 140. A video decryptor 150 receives the encrypted encoded video 155 from media rendering device 10 systems which may include either real time video streaming systems or long term storage systems, such as long term storage 170. The video decryptor 150 also receives control words produced by the smart card interface 140, and decrypts encrypted encoded video 155 according to the control words. The decrypted encoded video is decoded by a video decoder 160.

The processor is further operationally connected to the long term storage 170, non-transitory computer-readable storage media (i.e. memory) 173, and a user interface 175. The user interface 175 may include an electronic program guide and its sub-processes, as well as user input/output mechanisms, as are known in the art. The memory 173 may store instructions, which the processor 120 may execute in order to perform the methods described herein. The media rendering device 10 also comprises typical and standard other hardware, middleware and software components as are known in the art, and which, for ease of depiction, are not shown in FIG. 1.

The processor 120 is also operationally connected to a display output process 180 which comprises the embedder 185. The embedder 185 receives decoded decrypted video from the decoder 160 and, as will be described below, embeds the subscriber ID into the video 190. The subscriber ID embedded video 190 is output by the media rendering device 10 and may be displayed on a video display.

A range of subscriber IDs (by way of a non-limiting example, 0x000000-0xFFFFFF) are encoded by the embedder 185 into a set of combinations of semi-transparent overlay blocks in several locations in the video for a variable period of time. As was noted above, these embedded overlays are created by the display output process 180, which may itself be a process of the EPG. A set of the overlays typically are shown on the video display for a long period of time (for example, 60 seconds). The overlays are typically large enough (up to ⅛ of the screen in some embodiments) so hackers will not black out these areas comprising the embedded overlays, because if they do, a large portion of the image on screen will be blacked out for this long period (i.e. an $⅛^{th}$ of the screen will be blacked out for one minute, in this example). The overlay however, is designed to be almost imperceptible to human vision, and therefore, in principle will not disturb user viewing experience.

In order to encode 100,000,000 IDs, for example, the display output process 180 splits the screen into 8 imaginary blocks, covering each imaginary block in an overlay for 1 to 10 seconds. As such, $10^8$ combinations of IDs (i.e. 100,000,000 IDs) may be encoded using the 8 imaginary blocks. The display output process 180 creates several transparent (about 90% transparency) overlays to embed in assorted locations on screen for a variant period of time each according to the given subscriber ID.

Since hackers can add additional random overlays on the pirated video stream for random number of seconds, the video provider 20 generates a random key (hereinafter, "key") and send the key every time the video provider 20 sends a command to embed the subscriber ID value in the video. The display output process 180 will translate the key to various shapes of overlays, in order that, based on the shapes of the overlays, a detection mechanism can overcome the random overlays added by the hackers. Reference is now made to Appendix A, which discusses the computational difficulty of finding randomly positioned overlays by temporal analysis of video, especially if the hacker has access to both the encoded video (possibly content encrypted) and the rendered video frames.

Figure 2:
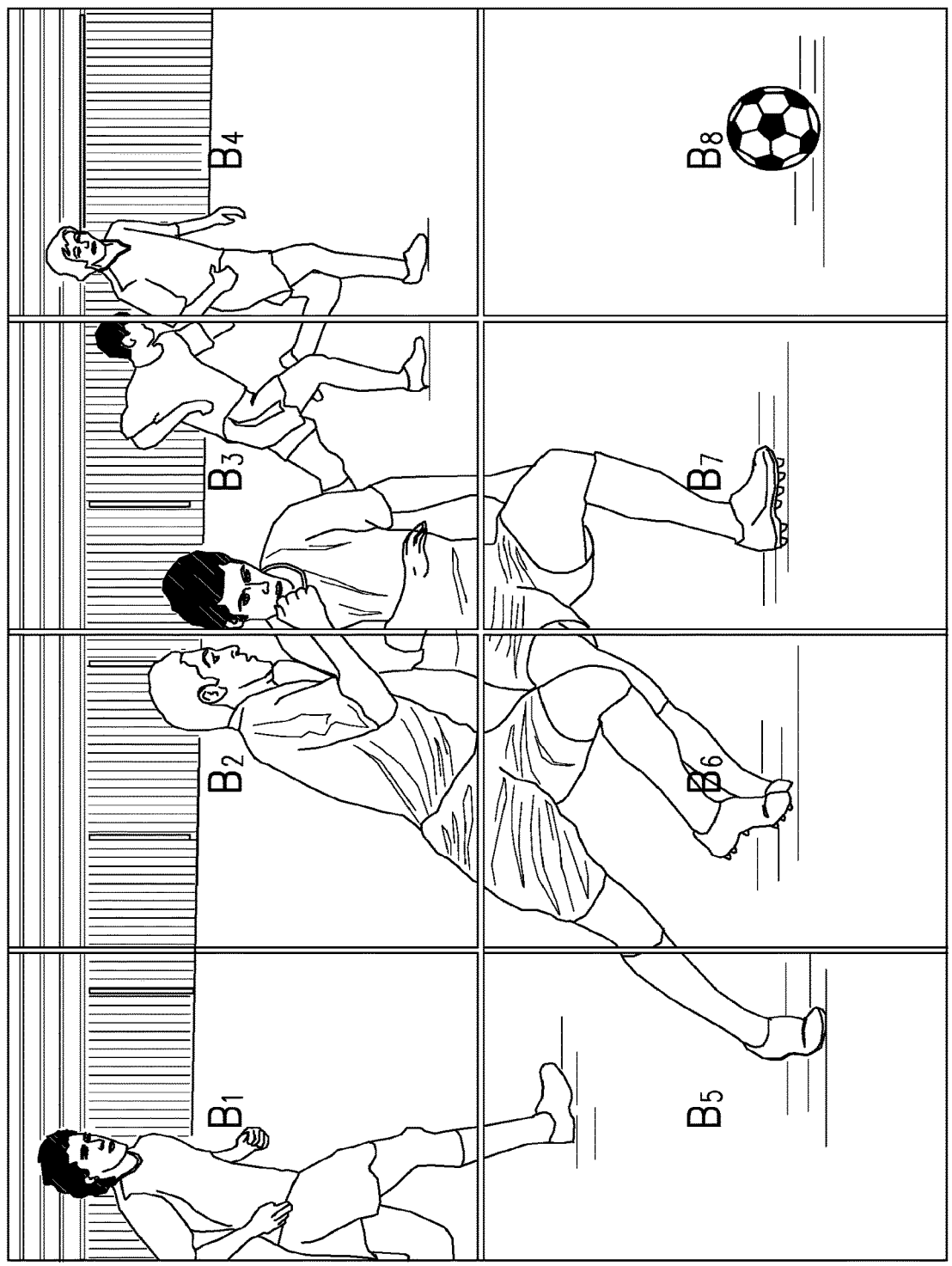
FIG. 2 is a simplified pictorial illustration of a video frame subdivided into logical blocks for embedding an overlay.

Reference is now made to FIG. 2, which is a simplified pictorial illustration of a video frame subdivided into logical blocks for embedding an overlay. The display output process 180 (FIG. 1) splits frames of the video to be displayed into a plurality of logical blocks, $B_1, B_2, \ldots, B_n$, (depicted as blocks $B_1$-$B_8$ in FIG. 2) and adds an embedded overlay on the logical blocks as described below. This adding of the embedded overlay on the logical blocks is typically performed at the interface level, i.e. using HTML 5 or flash to inject a nearly transparent user interface element into the video.

The display output process 180 receives the subscriber ID, for example, an ID of the smart card 130 of FIG. 1. Alternatively, the subscriber ID may be a media device ID, in the case of DRM (digital rights management), OTT (over the top), or other non-STB based systems. The display output process 180 performs an injective transformation, denoted E, mapping the received smart card 130 ID to a set of pairs: $\{(B_1, X_1), (B_2, X_2), \ldots, (B_n, X_n)\}$, such that n is the total number of blocks per video frame, and $X_i$ is the number of time periods to put an embedded overlay on block B. The embedded overlay will not overlay the entire logical block, as will be discussed in greater detail below. The display output process 180 is provided by the video provider 20 with a collection of several kind of predefined shapes which are used as overlays. Note that the time period may be a second, a second and a half, 400 milliseconds, or some other appropriate time.

Figure 3:
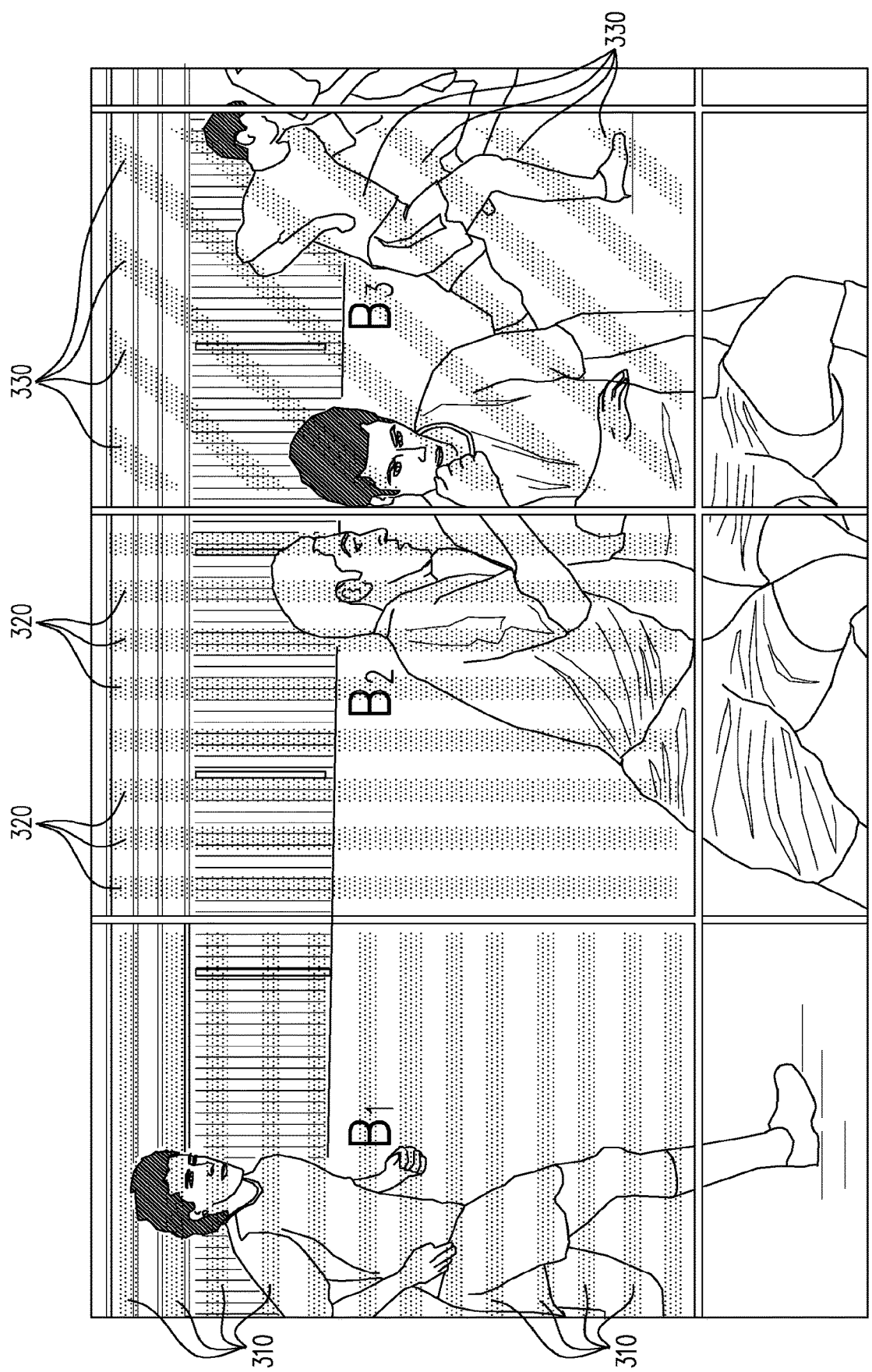
FIG. 3 is a simplified pictorial illustration of several logical blocks of the video frame of FIG. 2 with embedded overlays.

Reference is now made to FIG. 3, which is a simplified pictorial illustration of several logical blocks of the video frame of FIG. 2 with embedded overlays. FIG. 3 shows logical blocks $B_1$, $B_2$, and $B_3$ of FIG. 2, each of which has an embedded overlay of one particular exemplary pattern/shape. Specifically, logical block $B_1$ has an embedded overlay which comprises horizontal lines 310. Logical block $B_2$ has an embedded overlay which comprises vertical lines 320. Logical block $B_3$ has an embedded overlay which comprises 45 degrees lines 330. Other logical blocks may have embedded overlays which are pattern/shape, such as, but not limited to −45 degrees lines, diagonal lines at other angles, circular shapes, triangular shapes, fractal shapes, and so forth. It is appreciated that in FIG. 3 and the other figures that the embedded overlays are depicted so as to be visible. However, the embedded overlays which are embedded in displayed video are, by design, nearly transparent (e.g. around 90-95% or 89%-96% transparent), so as to be nearly imperceptible to a viewer of the video.

The embedded overlay of each block Bi will be changed once in a time period, for example, every second, second and a half, 400 milliseconds, or some other appropriate time, as noted above. It is appreciated that in cases of bright video content, the display output process 180 may be configured by the video provider 20 to embed the overlay for an increased amount of time (by way of example, 2 seconds instead of 1 second). The shape/pattern of the embedded overlay which will be used for the time period is determined using the key sent by the video provider 20 as will now be described.

Letting $F=\{F_1, F_2, \ldots, F_m\}$ be a set of the patterns (i.e. shapes) of the predefined overlays (e.g., the shapes/patterns mentioned above), and let k denote the key sent by the video provider 20, then, the display output process 180 performs the injective transformation E, as mentioned above, hereinafter designated, T, such that $T(k, i)=(F_{i,1}, F_{i,2}, \ldots, F_{i,xi})$, where every result $F_{i,j}$ in $T(k, i)$ is a shape selected from F. So, in the example in FIG. 3, logical block $B_2$ is covered with a pattern of vertical embedded overlays. The corresponding $F_{i,j}$ in $T(k, i)$ is, accordingly, a pattern of horizontal embedded overlays appearing in logical block $B_2$ of FIG. 3.

Given the ID of the smart card 130 and the key k, the display output process 180 now has a set of pairs, $\{(B_1, X_1), (B_2, X_2), \ldots, (B_n, X_n)\}$ and n corresponding sequences $(F_{i,1}, F_{i,2}, \ldots F_{i,Xi})$, one set of pairs and one corresponding sequence, for each block $B_i$. Accordingly, the display output process 180 is now able to encode the smart card ID on the screen with the overlays as described below. In order to increase the potential number of shapes in F, same shape with a different color can be used. For example, a horizontal, nearly-transparent overlay can be added in blue, red, or green (using an RGB palette).

For each block $B_i$, the display output process 180 adds an overlay for $X_i$ time periods, where, during the first time period the shape of the overlay will be $F_{i,1}$, and during the second time period the shape of the overlay will be $F_{i,2}$, and so forth, until, during the $X_i^{th}$ time period the shape of the overlay will be $F_{i,Xi}$.

Reference is now made to Table 1, which depicts the shapes with which n logical blocks, $B_1$-$B_n$ would be overlaid according to the above mentioned method:

TABLE 1

| Block | Time period 1 | Time period 2 | ... | Time period X |
|---|---|---|---|---|
| $B_1$ | $F_{1,1}$ | $F_{1,2}$ | ... | $F_{1,X1}$ |
| $B_2$ | $F_{2,1}$ | $F_{2,2}$ | ... | $F_{2,X2}$ |
| ... | ... | ... | ... | ... |
| $B_n$ | $F_{n,1}$ | $F_{n,2}$ | ... | $F_{n,Xn}$ |

Accordingly, in each logical block $B_i$, and in every time period, an embodiment of a method for detection will be able to determine what shape should be overlaid on each block B. Because the embodiment of the method for detection will determine that there is an overlay on a given block $B_i$, if the overlay is the expected shape. If, however, the overlay is not the expected shape, e.g., if a hacker has added an overlay on this block $B_i$, the embodiment of the method will filter out the hacker added overlay, because the hacker added overlay is typically not the expected shape. It is appreciated that if the hacker has manipulated the video stream by resizing, cropping, transcoding, and so forth, the embedded overlay will still be detectable by video comparison algorithms known in the art.

By way of example, consider a case where there are two logical blocks: $B_1$ and $B_2$, i.e., n=2. Let the set of shapes F be defined as: $F=\{F_1=\text{vertical lines}, F_2=\text{horizontal lines}\}$. Given an exemplary smart card ID which is 0x111111, the display output process 180 needs to map this smart card ID to the set of $\{(B_1, X_1), (B_2, X_2)\}$. For example, $\{(B_1, X_1), (B_2, X_2)\}$ may be $\{(B_1, 4), (B_2, 3)\}$, i.e. the embedded overlay should appear for 4 seconds (assuming the time period in the present example is one second) on the right logical block ($B_1$) and the embedded overlay should appear for 3 seconds on the left logical block ($B_2$).

Let k, the key sent to the display output process 180 by the video provider 20, for the purposes of the present example, be 0x222222. Therefore, the display output process 180 invokes T(0x222222, 1) and T(0x222222, 2) to get the sequences for choosing overlay shapes. For example: $T(0x222222, 1)=(F_2, F_1, F_1, F_1)$, by way of example, and $T(0x222222, 2)=(F_1, F_1, F_2)$, by way of example, i.e. in the first block ($B_1$), the display output process 180 will add an overlay for 4 seconds where in the first second it will be overlay of horizontal lines ($F_2$) and then 3 more seconds of vertical lines overlay ($F_1$). And in the left block ($B_2$) display output process 180 will add vertical lines overlay ($F_1$) for 2 seconds and then horizontal lines ($F_2$) for one more second. It is appreciated that the injective transformations given above in this example (i.e. $T(0x222222, 1)=(F_2, F_1, F_1, F_1)$ and $T(0x222222, 2)=(F_1, F_1, F_2)$ are arbitrary and just for the sake of example). The result of the above example is summarized by Table 2:

TABLE 2

| | Block | |
|---|---|---|
| Second | $B_1$ | $B_2$ |
| 1 | horizontal lines | vertical lines |
| 2 | vertical lines | vertical lines |
| 3 | vertical lines | horizontal lines |
| 4 | vertical lines | (no embedded overlay appears) |

In some embodiments, there is a reference set top box (or other media rendering device) which does not produce any modifications to a source video stream of the sort which would be introduced to a pirated version of the source video stream (which may, for example, be downloaded from a pirate website). In some embodiments, the reference set top box comprises a smart card 130 having a chosen smart card ID such that no overlays are produced for video displayed on the reference media rendering device 10. Alternatively, the video provider 20 may never address a command to embed an overlay to the reference smart card. By way of example, the reference command to implement the overlay embedding in the video may be addressed by bit, and this bit may be turned off in the reference set top box. For example, a bit in the smart card 130 or the smart card interface 140 may be set in the reference set top box which prevents the embedder 185 from embedding embedded overlays in the reference set top box.

Figure 4:
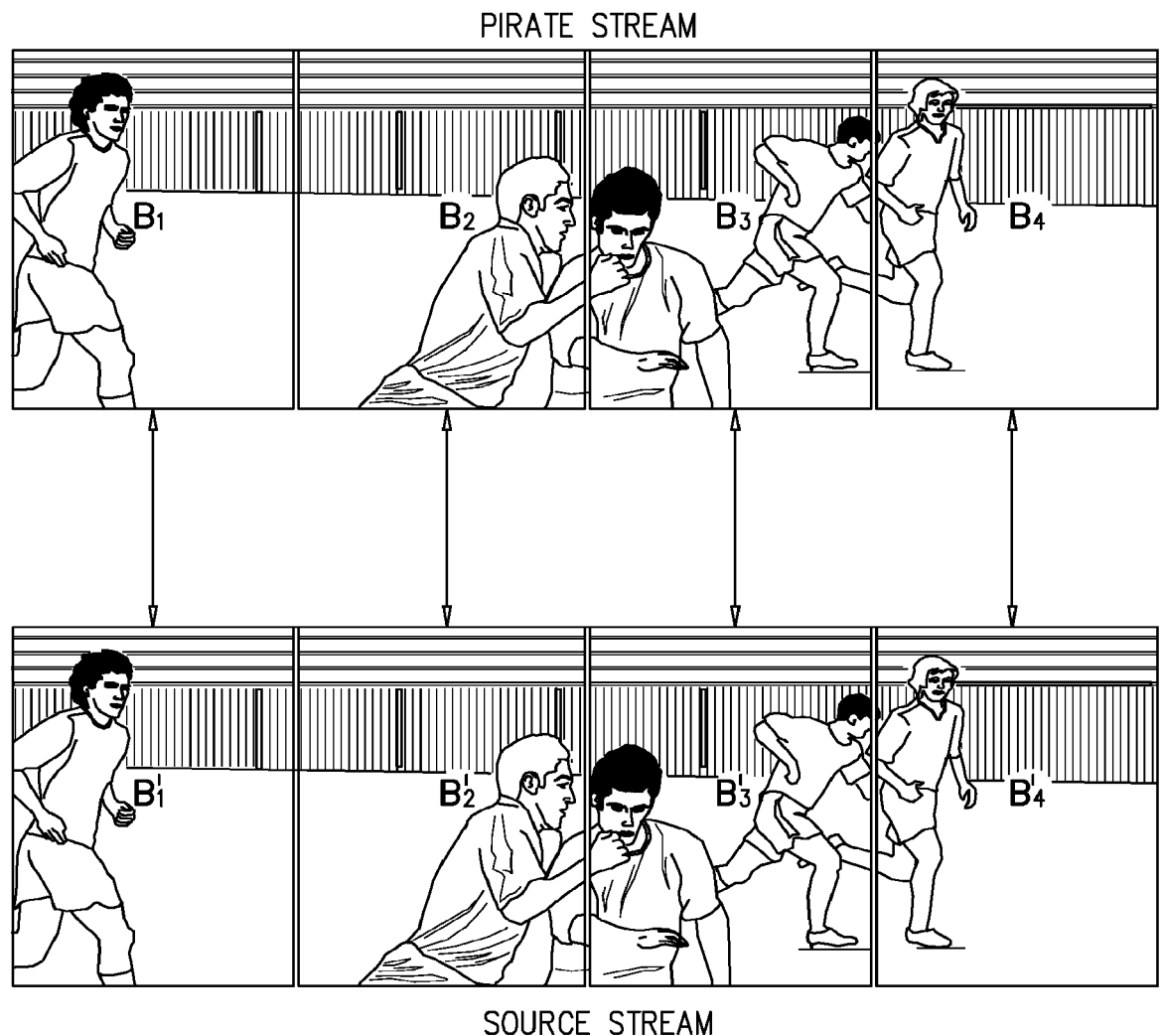
FIG. 4 is a comparison of a portion of each of two video frames comprising embedded overlays according to an embodiment, where one video frame is from a pirated stream and a second video frame is from a source stream.

Reference is now made to FIG. 4, which is a comparison of a portion of each of two video frames comprising embedded overlays according to an embodiment, where one video frame is from a captured pirated stream and a second video frame is from the source stream. In the one video frame from the pirated stream $B_1, B_2, \ldots, B_n$ denote the n blocks in the one video frame from the pirated stream. Similarly, the n blocks in the second video frame from source stream are denoted $B'_1, B'_2, B'_n$. $B_i$ and $B'_i$ are selected such that they share the same (i.e. corresponding) positions in their respective video frames. I.e. there is a one to one correspondence between positions of blocks in the same video frame between the two streams.

In an embodiment of the method for detection, each one of the blocks from the source stream is matched to a corresponding block in the given pirated stream i.e. $B_i$ to $B'_i$. For each i, $B_i$ will be (partially) overlaid by the transparent overlay for Xi time periods. The embodiment of the method for detection finds $X_1, X_2, \ldots, X_n$ so that $X_i$ is the number of time periods for which $B_i$ was overlaid by the embedded overlay. Even though the overlays are nearly transparent (for example, 90-95% or 89%-96% transparent), the first, captured pirated stream is compared to the second, reference stream, thereby enabling determining when the embedded overlay appear in the captured pirate stream on each block and for how many time periods. The $\{(B_1, X_1), (B_2, X_2), \ldots, (B_n, X_n)\}$ set can then be retrieved from the captured pirate video stream. Because E is an injective transformation, there is only one single corresponding ID matching the $\{(B_1, X_1), (B_2, X_2), \ldots, (B_n, X_n)\}$ set to the smart card ID from which the captured pirated video was taken.

As was noted above in the description of the method of encoding, when decoding the smart card ID, it is known, for each time period, what shape/pattern of embedded overlay should be in every logical block. Accordingly, embedded overlays which might have been added by the hacker can be filtered out and ignored as spurious.

It is appreciated that the hacker might introduce a delay in the captured pirate stream resulting in a lag by comparison to the reference video stream. In order to alert the detection system that the encoding process (i.e. overlay embedding) is about to begin in the video, the display output process 180 may, in some embodiments, cover the entire video screen with a transparent overlay for few hundreds of milliseconds. Such an overlay eases synchronization between the captured pirated video and the reference video.

Continuing with the example brought above to show how the exemplary smart card ID 0x111111 can be encoded as embedded overlays, after matching and aligning the two video streams, the number of seconds (in the above example the time period was set to one second) that each block was to be covered by the embedded overlays is observed. In the decoding device, the mapping of the ID to set of $\{(B_1, X_1), (B_2, X_2)\}$ is also known. Since the transformation E is an injective transformation, there is only one value x such that $E(x)=\{(B_1, X_1), (B_2, X_2)\}$, namely, the exemplary smart card ID 0x111111.

Figure 5:
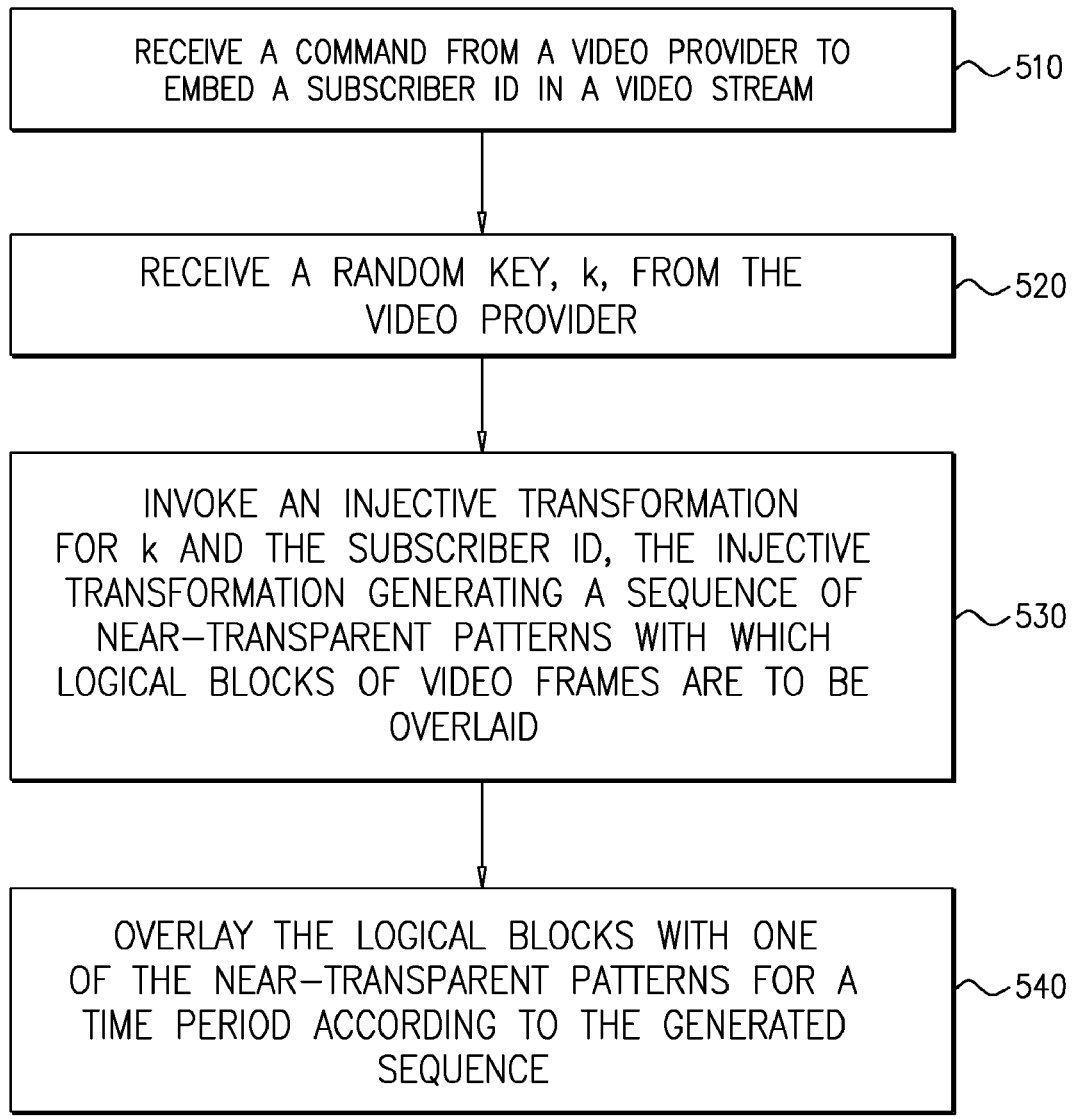
FIG. 5 is a simplified flowchart of a method of implementing an embodiment described herein at the set top box of FIG. 1.
Figure 6:
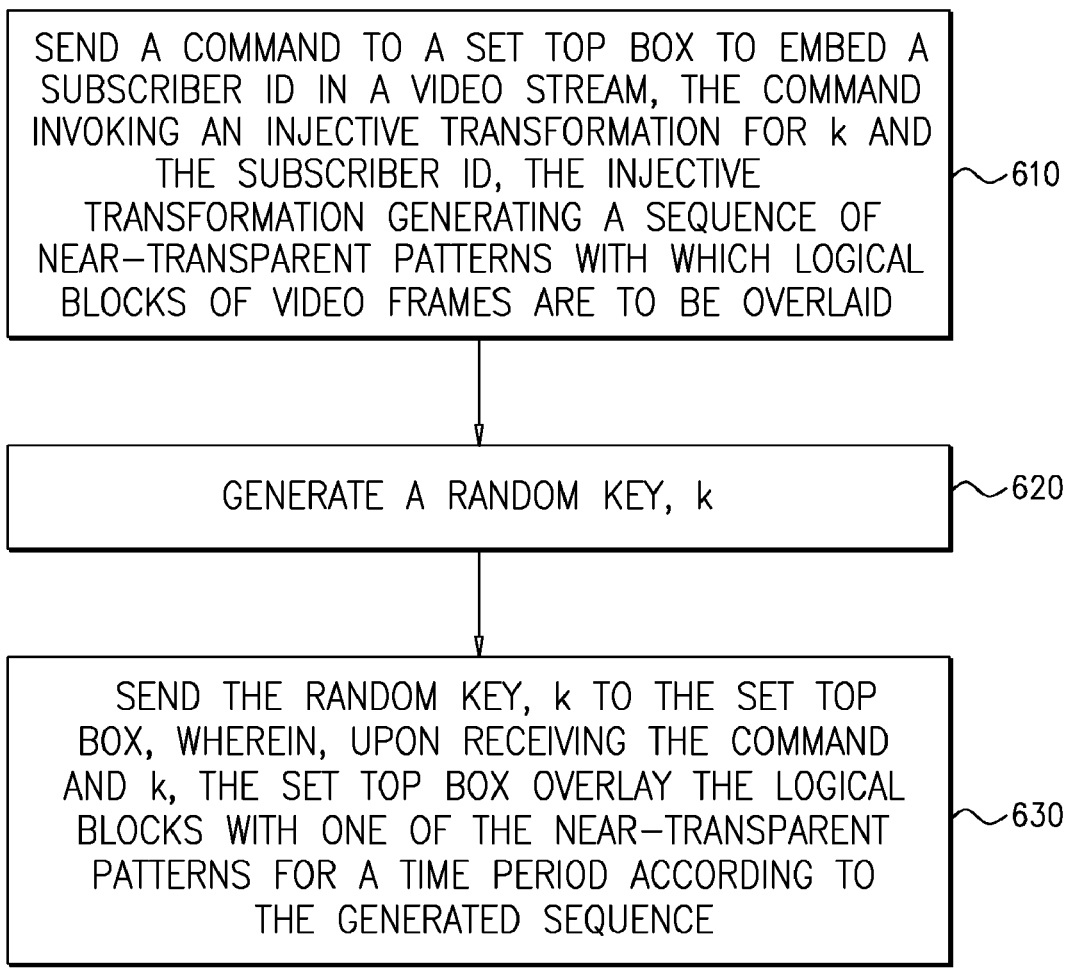
FIG. 6 is a simplified flowchart of a method of implementing an embodiment described herein at a video provider in communication with the set top box of FIG. 1.

Reference is now made to FIGS. 5 and 6. FIG. 5 is a simplified flowchart of a method of implementing an embodiment described herein at the media rendering device 10 of FIG. 1. FIG. 6 is a simplified flowchart of a method of implementing an embodiment described herein at a video provider 20 (FIG. 1) in communication with the media rendering device 10 of FIG. 1. The following discussion describes embodiments in the video provider 20 (FIG. 1), the smart card interface 140 (FIG. 1), and the display output process 180 (FIG. 1) in order to embed the overlay which encodes the unique subscriber ID, such as the smart card ID, as described above. The video provider 20 sends a command to embed the overlay in the video (step 510, 610). The command might be sent using one of an entitlement management message (EMM), and entitlement control message (ECM) or other command available to the video provider 20. The video provider 20 also generates the random key, k (steps 520, 620). The key, k, is sent to the set top box in an appropriate command (step 630), as described above.

The commands are received from the video provider 20 in the smart card interface 140. The smart card interface 140 sends the command to embed the overlay to the display output process 180 with the key k and value of the smart card ID to be embedded in the video to be displayed.

The display output process 180 invokes the injective transformation E (step 530) for the given subscriber ID (such as the smart card ID) in order to generate the set of pairs: $\{(B_1, X_1), (B_2, X_2), \ldots, (B_n, X_n)\}$. For each value of i and key k, the display output process 180 invokes T(k, i), thereby generating a sequence: $(F_{i,1}, F_{i,2}, \ldots, F_{i,Xi})$, accordingly determining the shape/pattern of each overlay for every given time period.

The display output process 180 covers each block, $B_i$, with a nearly transparent overlay of the shape $F_i,1$ for a first time period. The block $B_i$ is then covered with a nearly transparent overlay of shape $F_i,2$ for a second time period, and so forth (step 540).

Marking the video this way results in video which has been uniquely marked with nearly transparent embedded overlays. Hackers, however, are not able to cover the embedded overlays, because covering the embedded overlay with a black block, for instance, effectively covers a substantial portion of the video, negatively effecting viewing experience (e.g. an eighth of the screen for a second). Alternatively, if the hackers were to cover the video with a transparent overlay, the detection method filters out these overlays as part of the detection process.

Figure 7:
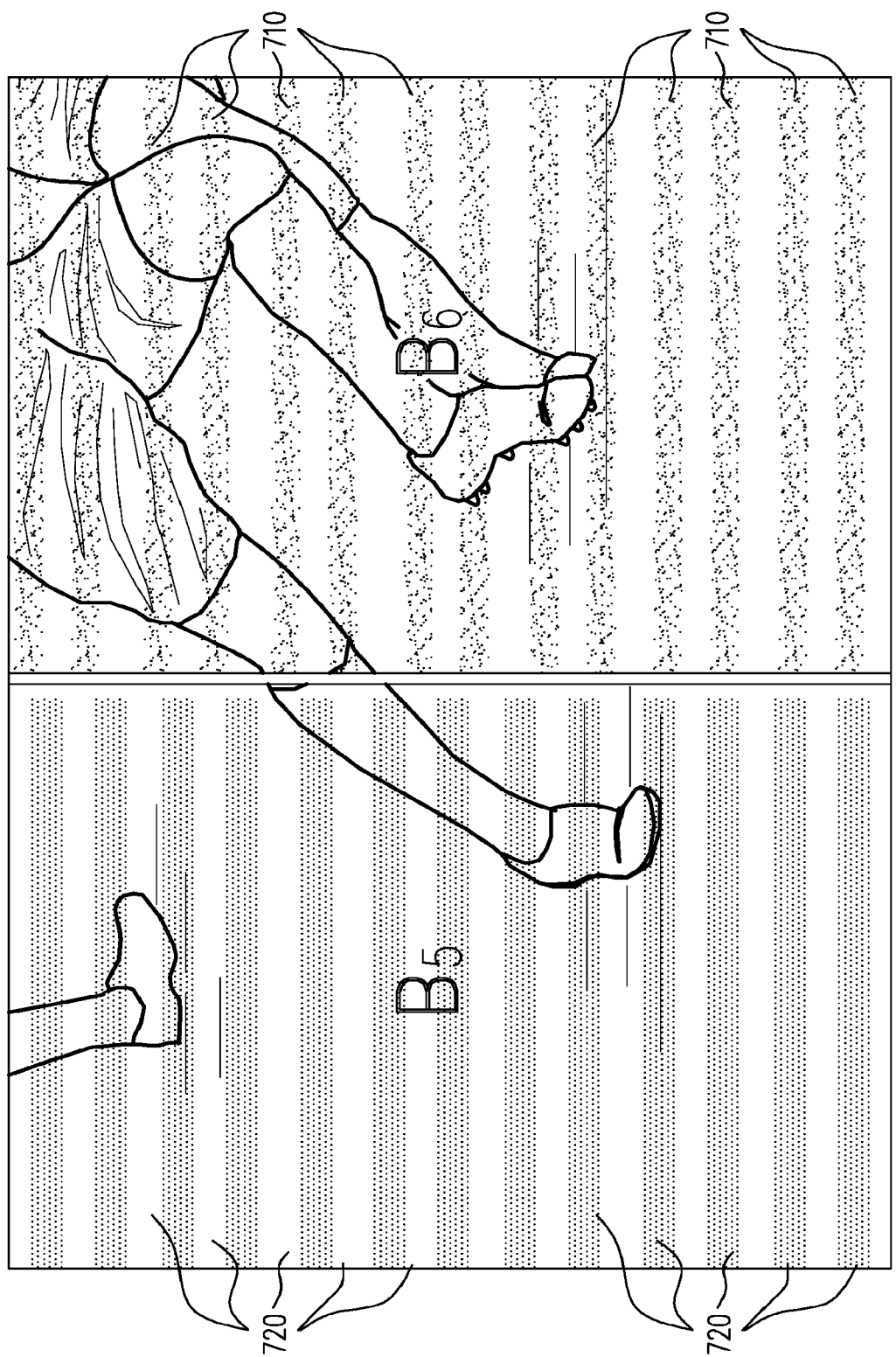
FIG. 7 is a simplified pictorial illustration of alternative embodiments of the embedded overlays of FIG. 3.

Reference is now made to FIG. 7, which is a simplified pictorial illustration of alternative embodiments of the embedded overlays of FIG. 3. In some embodiments of the overlays, such as those depicted in FIG. 5, the display output process 180 may set overlay edges as irregular gradients of the transparent pattern 710 (as in block $B_6$), rather than the full transparent overlay 720, as depicted in block $B_5$. It is appreciated that using an irregular gradient of the transparent pattern will have the effect of decreasing the visibility of the overlays.

EMBEDDED VERSUS ENCODED VERSUS ENCRYPTED

The term "embedded" is used throughout the present specification and claims, in all of its grammatical forms, to refer to any type of activity involving placing the watermark, or portions thereof, in the video stream. For example, "embedding the watermark", "embedded bit", "a watermark embedding device", and so forth.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:

encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

APPENDIX A

Appendix A is a discussion of the computational difficulty of finding randomly positioned overlays by temporal analysis of video, especially if the hacker has access to both the encoded video (possibly content encrypted) and the rendered video frames.

Let the following variables be defined, such that:
D=a maximum number of seconds to show an overlay on a block
R=a time to show each form of overlay
S=a number of subscriber IDs to be encoded by overlays
F=a number of forms for the overlays
C=a number of colors to select for the overlays (by using different colors of forms in F, the potential different overlays can be multiple)

Then, the probability P that a hacker is able to interfere with the decoding algorithm is:

$$P = \frac{\log_{(\frac{D}{R}+1)}(S)}{CF}$$

By way of proof of the above, consider the following example. Assume D, the maximum number of seconds to show an overlay on a block, is 90 and R, the time to show each form of overlay, is 5 seconds. In this case, a block may have an overlay for 0, 5, 10, 15, , , , 90 seconds, allowing for an overlay duration of 5 seconds.

Assume that F, the number of forms for the overlays, is 30, and C, the number of colors to select for the overlays, is 8 (when using RGB, there are $2^3$ basic colors which are used, in order to ease decoder calculations).

Then, in block I, for the first 5 second overlay, there are 30*8=240 different shapes which may comprise the overlay. Similarly, for the next 5 seconds, and each subsequent 5 second period, there are 240 potential different overlays.

In order to mimic the encoder and disturb the decoder by adding another overlay, the hacker has to guess the form and color for its added overlay. And the probability to achieve this is 1/(C*F), in the exemplary case it will be 1/(8*30)=1/240. However, that is for a single block. If, however any given video frame is divided into n logical blocks, and the hacker has to correctly mimic one overlay in at least one logical block, then the probability of the hacker adding the correct shape in one of the blocks (and so mimic the encoder's encoding) is n/(C*F).

Thus, to complete the proof, it is necessary to show that:

$$n = \log_{(\frac{D}{R}+1)}(S)$$

Since in each block the overlay can be shown for 0 seconds, or R seconds, or 2*R seconds, . . . , or D seconds, there are (D/R)+1 options (theoretically, if there was only one block, (D/R)+1 different subscriber IDs could be encoded). Since there are n blocks, there are ((D/R)+1)$^n$ options, i.e. one option for each subscriber ID.

Since there are S subscriber IDs which could be encoded, then:

$$((D/R)+1)^n = S$$

Thus, $$\log_{(\frac{D}{R}+1)}\left(\frac{D}{R}+1\right)^n = \log_{(\frac{D}{R}+1)}(S)$$

And therefore, $$n = \log_{(\frac{D}{R}+1)}(S)$$

Accordingly, the number of blocks is $$\log_{\left(\frac{D}{R}+1\right)}(S).$$

And thus, in the above example, S=10,000,000, then in the above example, the probability that a hacker will successfully mimic the encoder is:

$$P = \frac{\log_{\left(\frac{D}{R}+1\right)}(S)}{CF} = \frac{\log_{\left(\frac{90}{5}+1\right)}(10,000,000)}{8 \cdot 30} = \frac{\log_{(19)}(10,000,000)}{240} < 0.025$$

In systems where such an option is available, once a particular subscriber ID is determined to be the hacked, then an on-screen display (OSD) may be addressed to that particular subscriber ID. The hacked stream can then be checked to verify if the OSD appears in the stream when displayed.

What is claimed is:

1. A method comprising:
   invoking, by a media rendering device, an injective transformation for a random key, k, and a subscriber ID, the injective transformation generating a sequence of pairs of: near-transparent patterns and corresponding time periods, wherein the injective transformation comprises:
      mapping the subscriber ID to a set of pairs: {(B1, X1), (B2, X2), ..., (Bn, Xn)}, wherein n is the total number of logical blocks per video frame, and Xi is the number of time periods to overlay an embedded overlay on block Bi,
      creating a set of sequences of the near-transparent patterns, each one of the patterns being associated with one logical block, and
      displaying one of the near-transparent patterns of the set of sequences on each one of the logical blocks for the number of time periods; and
   overlaying the logical blocks of at least one video frame in a video stream with one of the near-transparent patterns for its one of the corresponding time periods.

2. The method according to claim 1, further comprising outputting the at least one video frame in the video stream in the logical blocks overlaid with the near-transparent patterns having a color component.

3. The method according to claim 1, wherein the subscriber ID comprises one of the following: a smart card ID and a device ID.

4. The method according to claim 1, wherein the size of each of the logical blocks is equal to up to one eighth of a size of a video display screen of the media rendering device.

5. The method according to claim 1, wherein the time period is one second.

6. The method according to claim 1, wherein the near-transparent patterns are between 89% and 96% transparent.

7. The method according to claim 1, wherein the near-transparent patterns are imperceptible to the human eye.

8. The method according to claim 1, wherein the near-transparent patterns comprise one of: horizontal lines; vertical lines; diagonal lines; circular shapes; triangular shapes; fractal shapes; and an irregular gradient.

9. A system comprising:
   a memory storage; and
   a processing unit coupled to the memory storage, wherein the processing unit is operative to:
      invoke an injective transformation for a random key, k, and a subscriber ID, the injective transformation generating a sequence of pairs of: near-transparent patterns and corresponding time periods, wherein the processing unit being operative to invoke the injective transformation comprises the processing unit being operative to:
         map the subscriber ID to a set of pairs: {(B1, X1), (B2, X2), ..., (Bn, Xn)}, wherein n is the total number of logical blocks per video frame, and Xi is the number of time periods to overlay an embedded overlay on block Bi,
         create a set of sequences of the near-transparent patterns, each one of the patterns being associated with one logical block, and
         display one of the near-transparent patterns of the set of sequences on each one of the logical blocks for the number of time periods; and
      overlay the logical blocks of at least one video frame in a video stream with one of the near-transparent patterns for its one of the corresponding time periods.

10. The system according to claim 9, wherein the processing unit is further operative to output the at least one video frame in the video stream in the logical blocks overlaid with the near-transparent patterns having a color component.

11. The system according to claim 9, wherein the subscriber ID comprises one of the following: a smart card ID and a device ID.

12. The system according to claim 9, wherein the size of each of the logical blocks is equal to up to one eighth of a size of a video display screen of a media rendering device.

13. The system according to claim 9, wherein the time period is one second.

14. The system according to claim 9, wherein the near-transparent patterns are between 89% and 96% transparent.

15. The system according to claim 9, wherein the near-transparent patterns are imperceptible to the human eye.

16. The system according to claim 9, wherein the near-transparent patterns comprise one of the following: horizontal lines; vertical lines; diagonal lines; circular shapes; triangular shapes; fractal shapes; and an irregular gradient.

17. A non-transitory computer-readable medium that stores a set of instructions which when executed perform a method comprising:
   invoking, by a media rendering device, an injective transformation for a random key, k, and a subscriber ID, the injective transformation generating a sequence of pairs of: near-transparent patterns and corresponding time periods, wherein the injective transformation comprises:
      mapping the subscriber ID to a set of pairs: {(B1, X1), (B2, X2), ..., (Bn, Xn)}, wherein n is the total number of logical blocks per video frame, and Xi is the number of time periods to overlay an embedded overlay on block Bi,
      creating a set of sequences of the near-transparent patterns, each one of the patterns being associated with one logical block, and
      displaying one of the near-transparent patterns of the set of sequences on each one of the logical blocks for the number of time periods; and
   overlaying the logical blocks of at least one video frame in a video stream with one of the near-transparent patterns for its one of the corresponding time periods.

18. The non-transitory computer-readable medium according to claim 17, further comprising outputting the at least one video frame in the video stream in the logical blocks overlaid with the near-transparent patterns having a color component.

19. The non-transitory computer-readable medium according to claim 17, wherein the near-transparent patterns are imperceptible to the human eye.

20. The non-transitory computer-readable medium according to claim 17, wherein the near-transparent patterns comprise one of: horizontal lines; vertical lines; diagonal lines; circular shapes; triangular shapes; fractal shapes; and an irregular gradient.

* * * * *